Aug. 15, 1933.    F. E. ASELTINE    1,922,414
CARBURETOR
Filed May 3, 1929    5 Sheets-Sheet 1
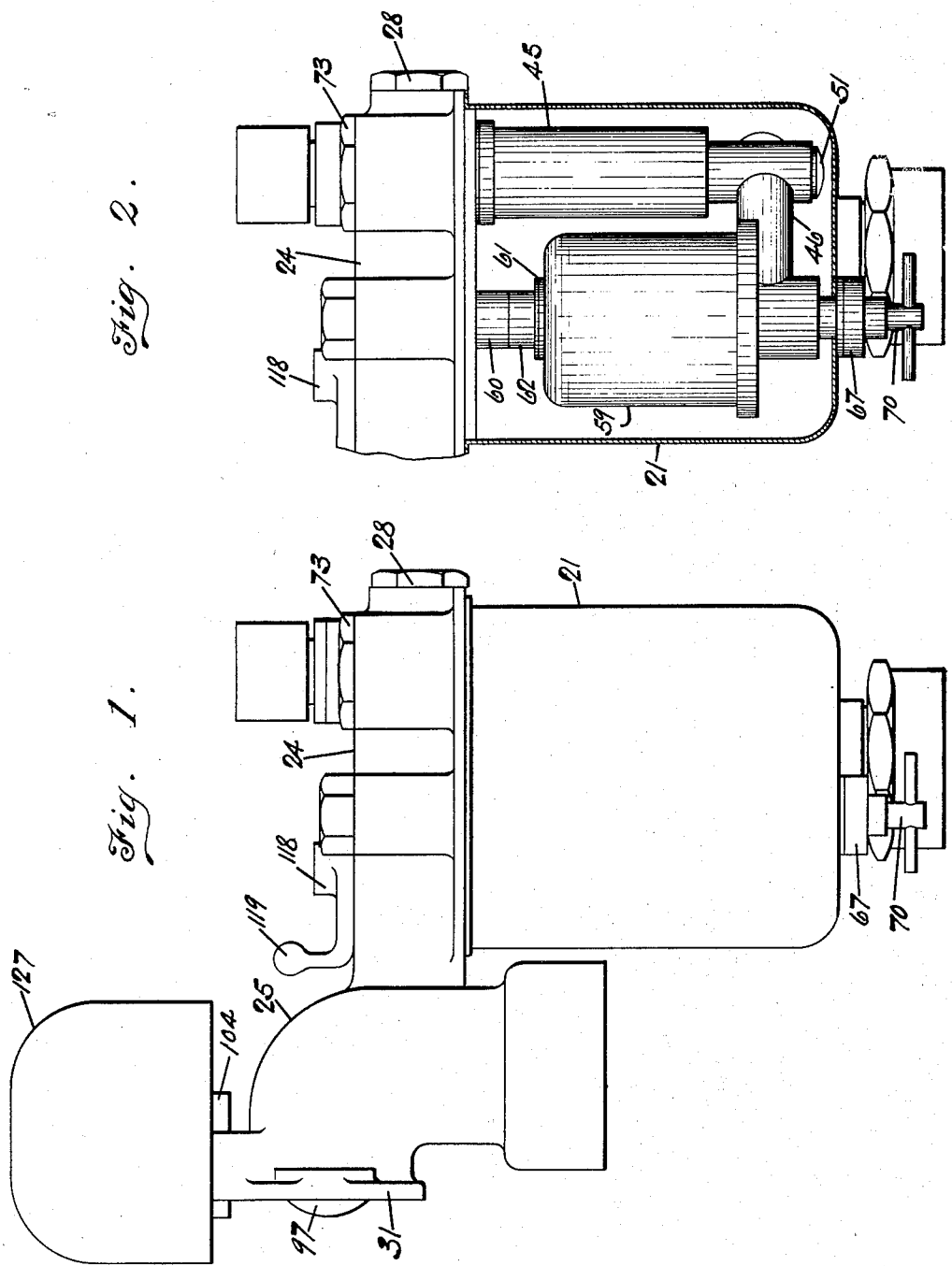
Inventor
Fred E. Aseltine
By Spencer Hardman & Fehr
Attorneys Aug. 15, 1933.    F. E. ASELTINE    1,922,414
CARBURETOR
Filed May 3, 1929    5 Sheets-Sheet 2

Inventor
Fred E. Aseltine
By Spencer Hardman and Feder
Attorneys

Aug. 15, 1933.  F. E. ASELTINE  1,922,414
CARBURETOR
Filed May 3, 1929   5 Sheets-Sheet 3

Inventor
Fred E. Aseltine
By Spencer Hardman & Feb
Attorneys

Aug. 15, 1933.   F. E. ASELTINE   1,922,414
CARBURETOR
Filed May 3, 1929   5 Sheets-Sheet 4

Inventor
Fred E. Aseltine
By Spencer Hardman and Feb
Attorneys

Aug. 15, 1933.  F. E. ASELTINE  1,922,414
CARBURETOR
Filed May 3, 1929   5 Sheets-Sheet 5

Inventor
Fred E. Aseltine
By Spencer Hardman and Fehr
Attorneys

Patented Aug. 15, 1933 1,922,414

UNITED STATES PATENT OFFICE 1,922,414

CARBURETOR

Fred E. Aseltine, Dayton, Ohio, assignor to Delco Products Corporation, Dayton, Ohio, a Corporation of Delaware Original application May 9, 1923, Serial No. 637,829. Divided and this application May 3, 1929. Serial No. 360,024

11 Claims. (Cl. 290—31)

This invention relates to means for supplying to an internal combustion engine charges of fuel mixed with a supporter of combustion, and is particularly adapted for engines which run at constant speed.

Objects of the invention are to supply a comparatively rich fuel mixture or priming to an internal combustion engine at starting and during initial operation and thereafter, when the engine is warmed and running normally, to supply a comparatively lean mixture; to heat the fuel or fuel mixture in its course to the engine during the initial period of operation; to interpose a baffle during cold weather in a stream of liquid fuel particles flowing to the engine during said initial period of operation; to control the position of said baffle in response to the engine starting operation and temperature conditons; to regulate the quantity of fuel mixture in its passage from the point of primary pulverization to the point of throttle control in response to temperature conditions or otherwise, and in other respects to improve the operation of internal combustion engines by supplying fuel thereto in accordance with the demand of the engine.

This application is a division of application Serial No. 637,829, filed May 9, 1923.

The invention consists in the combination of elements and structure of parts described hereinafter, defined in the appended claims and illustrated in the accompanying drawings.

In the drawings, in which like parts are indicated by like reference characters:

Fig. 1 is a side elevation of the carburetor;

Fig. 2 is a view of the carburetor with the fuel reservoir thereof, a primer tank and priming fuel well and mixing chamber within said reservoir shown in section;

The drawings illustrate a preferred embodiment of the invention particularly adapted to a power, heat and light plant for farm or home use deriving its energy from an internal combustion engine designed to run at a constant speed.

Figure 17:
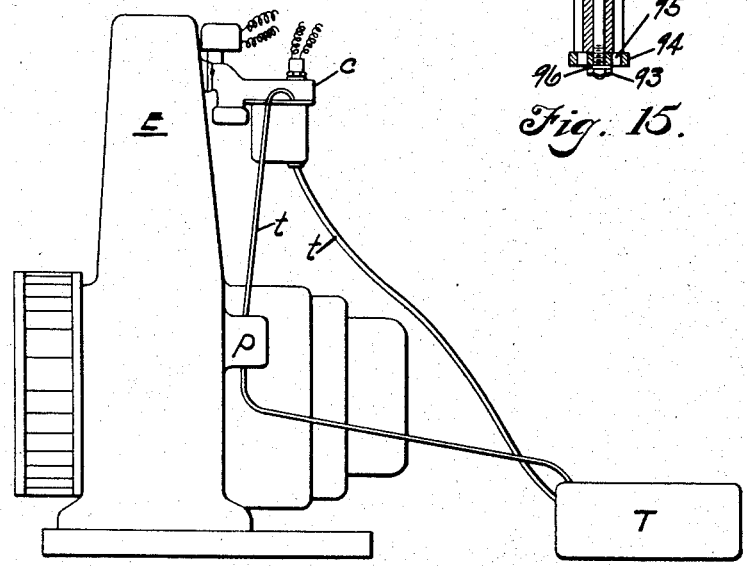
Fig. 17 is a view showing an internal combustion engine with the carburetor in place and the main fuel supply tank and conduits leading to and from the carburetor.

In Fig. 17, E indicates, in general, a power plant of well known type including an internal combustion engine and a dynamo-electric machine adapted to operate either as a generator or as a motor; C indicates a charge forming instrumentality, here designated a carburetor, for mixing air and fuel in proportions to form combustion charges and deliver them into the combustion chamber of the engine; T indicates a tank constituting the main fuel reservoir from which fuel is delivered to the carburetor by any suitable force feed means such as an engine driven pump designated by the letter P, through the delivery pipe t and to which surplus fuel may be returned through the return pipe t'.

Carburetor C comprises a body 20, which may be a single casting, a casing 21 constituting the main carburetor fuel reservoir into which fuel is delivered from main supply tank T and from which fuel is drawn to supply the needs of the engine, the necessary passages and ports for mixing the fuel with air and conducting it to the engine, and certain fuel modifying and supply controlling devices, all of which will be presently described.

The body 20 is adapted to be secured to the engine and supports all parts of the carburetor. It comprises a disc like member 22 having a generally flat under surface surrounded by a circular rebate 23 constituting a seat for the upper edge of casing 21 which is secured to and supported by said body in a manner to be described hereinafter. Crossing diametrically the upper side of disk member 22 and preferably integral with it is a ridge 24, one end of which may terminate substantially at the edge of the disk member 22, the other end merging into an elbow-like tubular member 25 overhanging the edge of the disk member, and having an open ended passage 26 extending therethrough. Within the ridge 24 is a passage 27 plugged at one end as at 28, the opposite reduced end 29 of which enters the passage 26 within the elbow-like element 25 between its ends. Passage 27 is in communication with the carburetor fuel chamber 21 by transverse port 30. The body 20 is intended to be bolted to the engine casing through flange 31, so that the upper and outer end of passage 26 registers with a charge intake port in the engine cylinder or intake manifold. The reduced end 29 of passage 27 terminates in a gradually contracting approach formed by sloping the wall of said passage at 32 in such manner as to leave the floor of passage 27 substantially straight between the port 30 and the reduced end of said passage where it communicates transversely with the passage 26. Between its open ends passage 26 is reduced as at 33, so as to receive a fixture 34 having an hour-glass shaped passage through it constituting a Venturi tube. In the outer side of fixture 34 is an annular groove 35 disposed a little above the narrowest portion of the Venturi passage, said groove communicating with said passage by means of ports 36 at points above the most contracted zone of the Venturi passage. Fixture 34 is held within member 25 by a screw 37 in such position that the reduced opening 29 of passage 27 communicates with the groove 35, the lower edge of said groove being flush with the lower side of said opening. The passage 27 which leads from the carburetor reservoir is herein designated the primary fuel passage and passage 26 with which passage 27 communicates at substantially right angles is herein designated the secondary fuel passage. If the carburetor fuel reservoir 21 is supplied with liquid fuel, the suction exerted by the engine when running is rendered effective, through means to be presently described, to draw a combustible mixture into and through the passage 27, and thence into passage 26 where it mingles with a supplementary current of air drawn through the Venturi conduit and passes to the combustion chamber of the engine.

Figure 7:
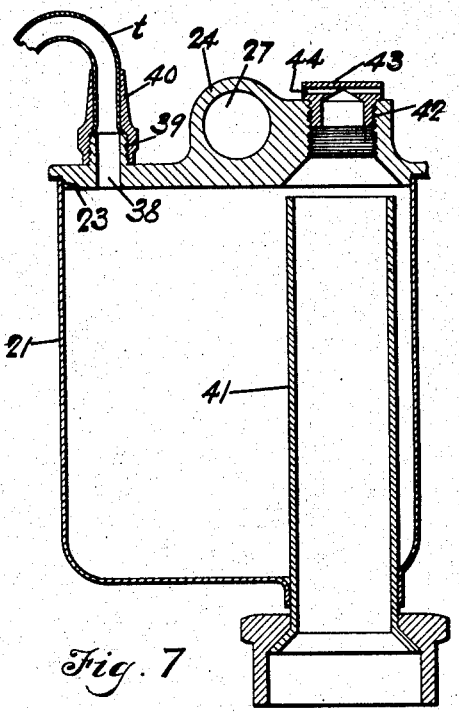
Fig. 7 is a sectional view taken along the line 7—7 of Fig. 3.
Figure 8:
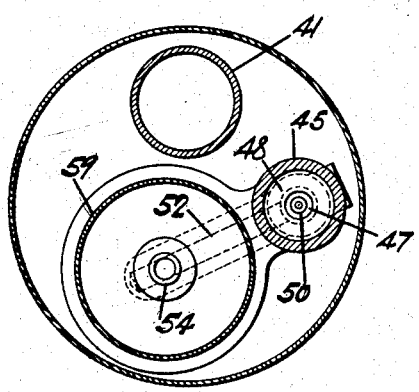
Fig. 8 is a sectional view taken along the line 8—8 of Fig. 6.

Fuel feed pipe t (see Figs. 3, 7 and 13) discharges liquid fuel into the carburetor reservoir 21 by way of hole 38 piercing the body 20, through the center of a threaded nipple 39, to which the discharge end of pipe t may be connected by an ordinary compression coupling nut 40.

Extending upward through the bottom of casing or reservoir 21 with which it makes a fluid tight connection, is a weir 41 consisting of a relatively large pipe, the open upper end of which reaches nearly to the under side of body 20. By this means the fuel in reservoir 21 is maintained during the normal operation of the engine at the level of the open upper end of said pipe, any excess supply running downward through said pipe whence it may be returned through pipe t' to the main supply tank T. There is a threaded hole 42 in body 20, coaxial with the weir 41, that is closed by a threaded vent plug 43 having small vents 44 therein to permit free communication between the external atmosphere and the air within the casing 21.

It has been stated that one of the objects of this invention is to supply a richer fuel mixture to the engine at starting and during initial operation than during the subsequent continued operation. The means by which this object is achieved is automatic in operation, depending upon engine conditions, and responding to the requirements thereof. It comprises an auxiliary reservoir or primer tank disposed within the casing 21, and communicating with the primary fuel mixture passage through a conduit which is common to both the normal fuel supply drawn directly from the reservoir formed by casing 21 and the auxiliary fuel supply drawn from the primer tank or auxiliary reservoir. The auxiliary reservoir is filled by gravity at times when the engine is not running and yields the supply then obtained at a decreasing rate during a short period after the engine has been started. The means by which this object is achieved will now be described.

Figure 6:
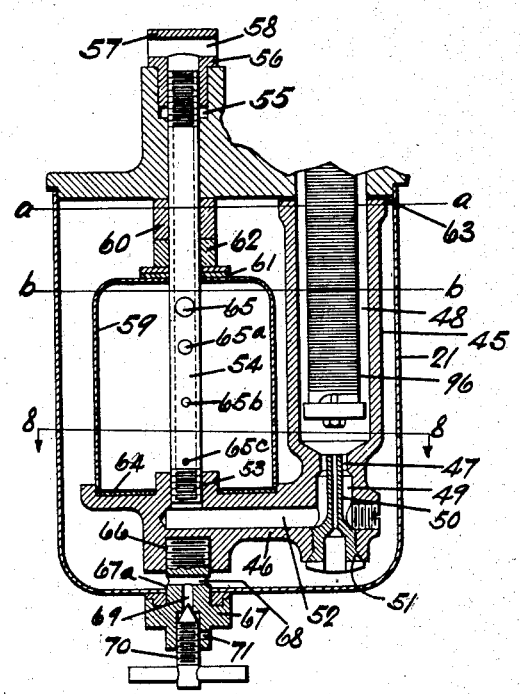
Fig. 6 is a section taken along the line 6—6 of Fig. 3.

Enclosed by casing 21 and supported (as best shown in Figs. 2 and 6) from body member 20 is a hollow body, conveniently made by casting, composed of two arms arranged to form a substantially right angled hole, one of the arms 45 extending vertically adjacent the inner wall of casing 21, and the other arm 46 extending horizontally from the lower end of arm 45. The vertical or upright arm 45 is drilled or otherwise provided with a passage extending completely through it from end to end, but counterbored or otherwise enlarged from each end, said enlarged portions of the passage being connected by a restricted port 47 nearer the lower than the upper end. The passage above the restricted port 47 constitutes a primary mixing chamber or initial fuel well 48 which is considerably larger and longer than the passage 49 below said restricted port. Horizontal arm 46 has therein a passage 52 extending from said passage 49 to a threaded hole 53 extending from it to the upper side of said arm. The passage 49 constitutes a conduit for auxiliary fuel on its way from the auxiliary reservoir, presently to be described, to the primary mixing chamber or fuel well 48 and also, particularly at times when the engine is well started and running normally, a passage by which air enters the primary mixing chamber or fuel well 48 and atomizes fuel drawn from the carburetor fuel reservoir; said passage 49 also accommodates a primary fuel supply jet nozzle 50, the lower end of which is in direct communication with the supply of fuel in reservoir 21 and the upper end of which terminates at the upper end of restricted port 47, leaving an annular space between it and the wall of said port for the passage of air or auxiliary fuel. The lower end of supply nozzle 50 has a threaded enlargement 51 by which it is secured within the lower threaded end of the passage 49.

Threaded into the threaded hole 53 in arm 46 is a tube 54 (see Fig. 6) the upper threaded end of which projects through an axially alined hole in body 20. The last named hole is counterbored at its upper end as at 55, and the upper threaded end of tube 54 is disposed within said counterbore. A special nut 56 is provided with an enlarged head 57 is screwed to the threaded end of the tube 54 within the counterbore, the underside of the nut head 57 bearing upon the upperside of the body 20 surrounding the counterbore. Communication between the external air and the upper end of tube 54 is obtained by lateral openings 58 in the nut head 57. Sleeved over tube 54 is an inverted bell-like shell or priming tank 59, which has a hole in it for the purpose, the lower open end of which rests against the upper side of arm 46 which is widened into a shelf and provided with an annular countersink for receiving the lower edge of the shell, suitable packing being interposed for the purpose of making the joint between shall and shelf fluid tight. Between the upper surface of shell or priming tank 59 and the lower surface of body 20 spacing or filling blocks are interposed, the tube 54 passing through and hold them in place. At least the spacers 60 and 61, respectively contacting with the upper side of the shell 59 and the lower side of the body 20, should be made of suitable yieldable packing material to insure that the joints shall be fluid tight. The intermediate spacers 62 may be of any suitable material. A gasket 63 may be placed over the upper end of arm 45, and a gasket 64 interposed between the shell 59 and its seat on arm 46. By turning the nut 56 in the proper direction the entire described assemblage within casing 21 may be clamped tightly in place. The upper end of arm 45 and upper spacer 61 will then bear snugly against the under side of the body 20, the fuel well or mixing chamber 48 then registering with port 30. That portion of tube 54 which is within the shell 59 has a number of lateral orifices 65, 65a, 65b, and 65c, spaced from each other longitudinally of the tube and progressively decreasing in area, respectively, from the highest opening 65 to the lowest 65c. The shell 59 constitutes a reservoir for the priming or auxiliary fuel supply hitherto mentioned, and cannot be filled, except by fluid flowing from the carburetor reservoir 21 through nozzle 50, nor discharged except through the annular space 47 encircling the end of said nozzle.

It has been stated heretofore that casing 21, which forms the carburetor fuel reservoir, is secured to body 20, but without specifying the means for securing it. Referring particularly to Fig. 6, it may be seen that the upper edge of casing 21 fits snugly within the rebate 23 as previously stated, with a suitable packing gasket properly disposed to make tight the joint between casing and body. In the bottom of casing 21 is a hole 67a which alines axially with tube 54 when the casing is in place. Also in axial alinement with tube 54, but in the under side of arm 46 is a threaded socket 66. A headed clamp screw 67, passes through the hole 67a and screws tightly into socket 66, thus binding the casing 21 against the body 20. A suitable packing gasket is interposed between the head of screw 67 and the bottom of casing 21 to prevent leakage.

In order that liquid may be drained from the carburetor fuel reservoir in case of need, a transverse duct 68 formed through the shank of clamp screw 67 communicates with a longitudinal duct 69 therein, which can be opened or closed by a needle valve 70 threaded in a counterbored portion of duct 69, and which, when opened communicates with an outlet 71. It will be apparent that if needle valve 70 is unscrewed in part fluid may escape through the lateral outlet 71, and if wholly removed, fluid may escape directly downward through the counterbore.

For the purpose of heating the fuel that is supplied to the engine during the period of starting or initial operation in cold weather, a heater is disposed in the fuel well or primary mixing chamber 48. The heater contrived for this purpose is best illustrated in Figs. 3, 4, 6, 15 and 16, to which reference will now be made.

Extending through the upper wall of described ridge 24 of body 20 is a threaded hole 72 which is in axial registration with the port 30 and fuel well 48 and penetrates to the primary fuel mixture passage 27. Within the threaded hole 72 is fitted a hollow screw 73 having a flange 74, the under side of which is adapted to rest on top of the ridge 24. An insulating plug 75 having a flange 76 fits within the hollow of screw 73 with its flange bearing on top of the flange 74. Two parallel metallic pins 77 and 78 functioning as conductor posts or terminals pass through said plug, preferably one on each side of the axis thereof, and project above the plug. Another insulating flanged body 79 having two metallic conducting sockets 80, 81 molded therein is arranged with its flange 82 in contact with the flange 76 of plug 75 and its socket 80, 81 in registration with pins 77, 78 which are seated in electrical contact with the socket leaving space at the upper end for insertion of conducting wires 83 and 84. Screws 85 pass through the flanges 76 and 82 of the described insulating bodies and are threaded into flange 74 of the hollow flanged screw 73. The assemblage just described constitutes a means for holding a heating element and for conducting current thereto.

Figure 16:
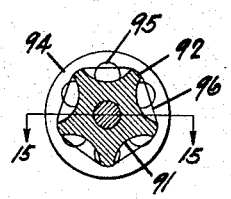
Fig. 16 is a sectional view taken along the line 16—16 of Fig. 15, but illustrating the winding in position.

A rod 88 having its upper end offset, as at 89, or otherwise formed so that it may be anchored to the insulated plug 75, and serve as a conductor, passes through and depends from the central portion of said plug, the upper end of said rod having electrical contact with the described metal pin 77. Surrounding and carried by the rod 88 is a heater core 90 made of any suitable insulating material, such as soapstone, not affected by fluid hydrocarbon fuels. The core 90 is preferably fluted, Fig. 16 showing it to have five alternately arranged parallel grooves and ridges 91 and 92 respectively. Lower end of rod 88 is threaded to receive a nut and washer 93, and an insulating collar or disk 94, preferably of soapstone, surrounds the rod and is held against the lower end of core 90 to sustain it by said nut and washer. Collar 94 is perforated, as at 95. A conducting wire 96 having one end attached to metallic pin 78 is wound helically around the core 90, passed through one of the holes 95 in collar 94 and secured in good electrical contact with rod 88, as by means of the nut or washer 93. When conductors 83 and 84 are properly connected with a source of electrical energy, a circuit is completed from conductor 83 through socket 80, pin 77, rod 88, heater wire 96, pin 78, socket 81 and conductor wire 84. As will be later explained, the heater is started in operation when the engine is started, provided the temperature is below a predetermined point, and ceases to operate after the engine is well started.

Figure 4:
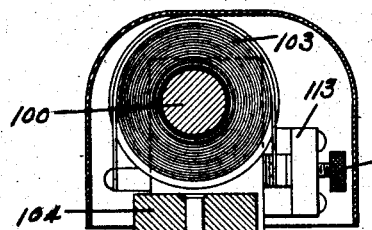
Fig. 4 is a vertical sectional view of the carburetor through the fuel mixture passages, certain parts being omitted for the sake of clearness.
Figure 5:
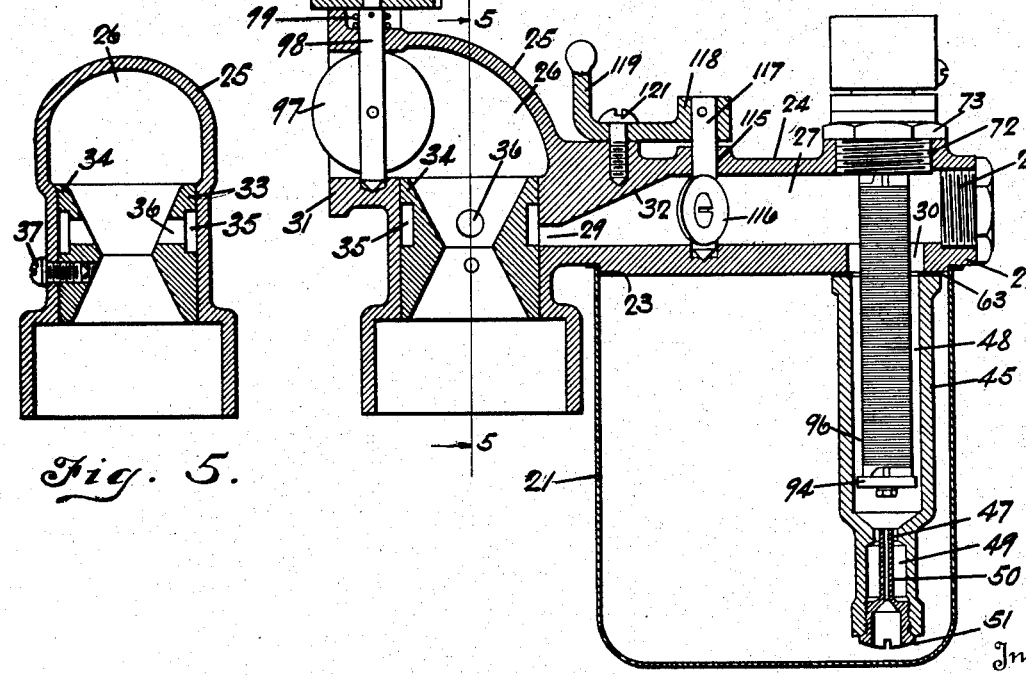
Fig. 5 is a section taken along the line 5—5 of Fig. 4, certain parts beyond the line of section being omitted.
Figure 14:
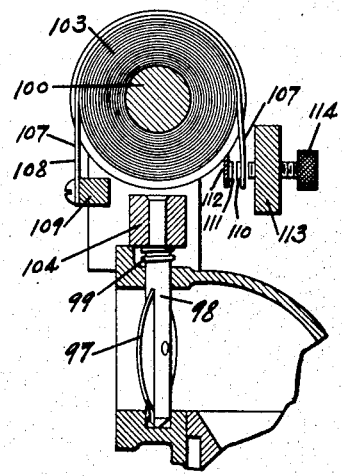
Fig. 14 is a view partially in section showing the thermostatically controlled circuit making and breaking element, its movable and stationary contact, the throttle having an armature secured to it, and an electro-magnet for operating the armature.

In Figs. 4 and 14 there is shown, located in the delivery end of secondary mixture passage 26, a valve 97, of butterfly type, which serves at times to baffle the stream of air and fuel flowing toward the engine intake. This valve or baffle 97 may be designated the throttle valve. It is secured to a rotary stem 98 and is susceptible of being arranged flatwise and parallel with the direction of flow of the combustible mixture, then offering little or no obstruction to the current, or crosswise or obliquely of the direction of flow to partially close the auxiliary passage, baffle the stream and receive upon itself the impact of drops or particles of liquid fuel being carried through the passage, which collide with it and are thereby broken into smaller particles to be mingled with the secondary stream of air. The wetting of the valve or baffle 97 also facilitates the evaporation of the fuel and the mixing of it with the air which rushes against and around said baffle. Valve 97 is held in wide open position by a spring 99 unless some other force is exerted to overcome the elastic force of the spring. Spring 99 is coiled around stem 98, with one end secured to the stem and the other end secured to the body 20.

In this embodiment the baffle plate or throttle valve 97 may be moved to partially close the passage 26 in opposition to the force of spring 99 by an electromagnet the construction and arrangement of which is illustrated in Figs. 3, 4, 11, 12, 13, and 14. The said electromagnet comprises a core 100 joining two arms 101 and 102, and surrounded by a coil 103. The arms 101 and 102 constitute the pole pieces which are mounted in any suitable manner upon the body 20. The armature of the magnet is a bar 104 secured to the valve stem 98 so that its longitudinal center line extends at a small angle to the plane of the valve, and tends to lie between the magnet poles transversely of lines extending between said poles, as indicated in Fig. 4, and by dotted lines in Fig. 11. When the coil is energized the armature 98 is attracted by the magnet into the position indicated in Fig. 14 and moves the valve 97 so as to partially close the passage 26. One end 105 of the winding 103 may lead directly to a source of electrical energy, but the other end 106 is connected to a thermostatic switch in order that the magnet may not be energized except when a predetermined low temperature exists.

Figure 11:
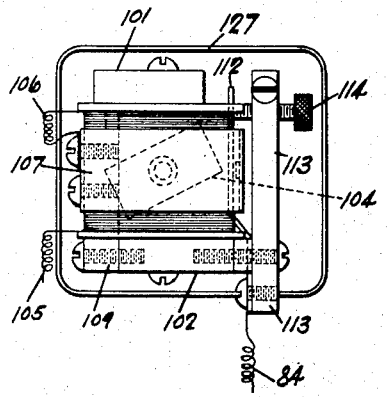
Fig. 11 is a plan view of the throttle operating device and a thermostatic control therefor, the cover being shown in section.
Figure 12:
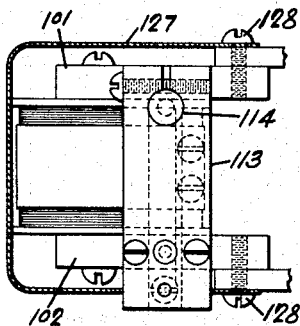
Fig. 12 is a side view of the device shown in Fig. 11 with the cover in section.
Figure 13:
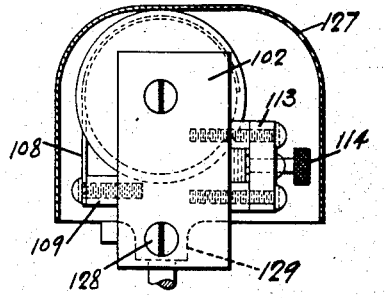
Fig. 13 is an end view of the device shown in Fig. 11 with the cover in section.
Figure 15:
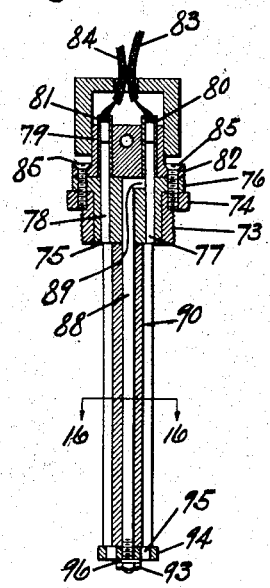
Fig. 15 is a sectional view of the heating unit shown in Fig. 4, the wire winding having been partially omitted for the sake of clearness.

The thermostatic switch mentioned in the preceding paragraph may comprise a heat responsive element 107, of ordinary bi-metallic or other suitable construction, of approximately inverted U shape arched over the coil 103. As shown in Figs. 11, 13 and 14, the one end 108, is secured to a supporting bar 109 while the other end is free and carries a contact 110. Another contact 111 is carried on a spring plate 112 in such position that when element 107 distorts in response to a sufficiently low temperature, contacts 110 and 111 will touch and complete a circuit to be presently described. Bar 109 may be secured to one of the arms or pole pieces of the magnet on one side, while on the other side may be secured a bar 113 to one end of which one offset end of the spring plate 112 is held. An adjusting screw 114 may be threaded through bar 113 adjacent its other end and bear against spring plate 112 so that the latter may be adjusted in such manner as to shift the position of contact 111 toward or away from contact 110, in order that said contacts may be adjusted to close at different temperatures. A conductor wire 84 leads from the spring plate 112 to a source of electrical energy through the described heater.

In the embodiment disclosed the assembly of the electro-magnetic throttle controlling means and the thermostatic circuit closer is housed and protected by an inverted cup shaped housing 127 which may be supported by any suitable means such as screws 128, passed through open end slots formed in downward projecting ears 129, and threaded to the magnet pole pieces or their supports. Housing 127 confines heat generated by the magnet coil and delays its dispersion. By reference to Fig. 17 it will be perceived that the housing 127 and inclosed assembly is so close to the engine that the heat generated by the engine during continued operation thereof will keep the thermostatic switch open and prevent operation of the heater or partial closing of the baffle or throttle 97 as long as the engine runs normally.

Figure 3:
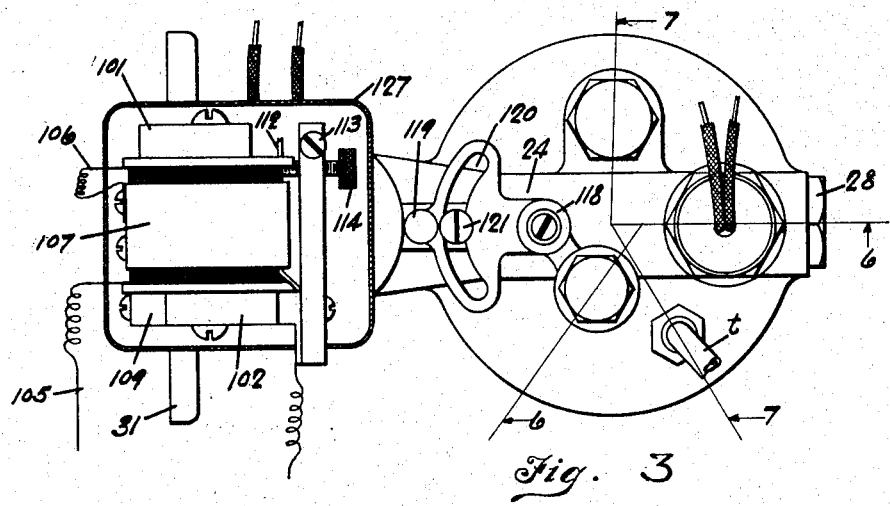
Fig. 3 is a plan view of the carburetor, the cover of a thermostatic switch and throttle controlling device being shown in section to expose the elements thereunder.

Before proceeding to a description of the electrical circuits and sources of electrical energy utilized in this invention, a means for regulating the size of the passage for fuel mixture in the priming fuel mixture passageway 27 will be described. Adapted to partially obstruct or open the passage 27 in a regulating valve 116, here shown as of butterfly type, secured to an oscillatory stem 117 extending across the passage and having one end protruding through a hole 115 in the top of the ridge 24 on body 20. To the protruding end of stem 117, as shown in Figs. 3 and 4, is fixed a lever 118 having a upturned handle 119 and a widened part provided with an arcuate slot 120 curved about the axis of stem 117 as a center. A headed screw 121 passes through said slot and, engages a threaded hole in the body 20. By this means the regulating valve 116 may be adjusted manually to afford any desired size of throat for passage of primary mixture, and said valve may be fixed in the chosen position by setting up the screw 121.

Figure 10:
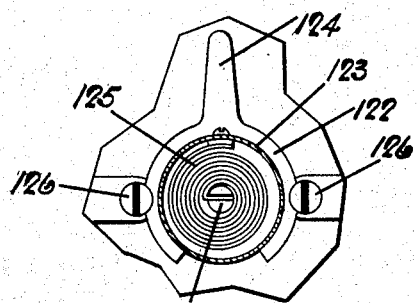
Fig. 10 is a detail sectional view taken along the line 10—10 of Fig. 9, showing in plan a thermostatic element for the regulating valve.
Figure 9:
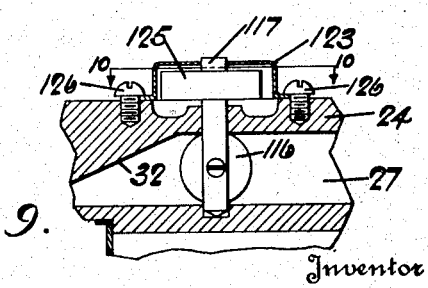
Fig. 9 is a part sectional view of the carburetor showing a modified regulating valve positioned in the primary mixture channel and an associated thermostatic controlling element.

Instead of the just described simple hand adjusting means for regulating valve 116, there may be substituted a hand adjusting device supplemented by an automatic means responsive to changes of temperature. This is illustrated in Figs. 9 and 10, wherein is shown an oscillatory plate 122 carrying a raised cylindrical housing 123 and having a handle 124 which adapts the plate to be moved angularly by hand about the axis of valve stem 117. The inner end of a spiral band 125 is secured to the stem 117, while the outer end thereof is secured to the housing 123. Screws 126 are provided for fixing the plate 122 in any desired position of adjustment. The spiral band 125 is a thermostatic element of known type which tends to contract or expand in response to variations of temperature. By means of the adjusting plate and lever described it may be so set as to regulate automatically the size of the throat through passage 27 in response to changes through a predetermined range of temperature.

Figure 18:
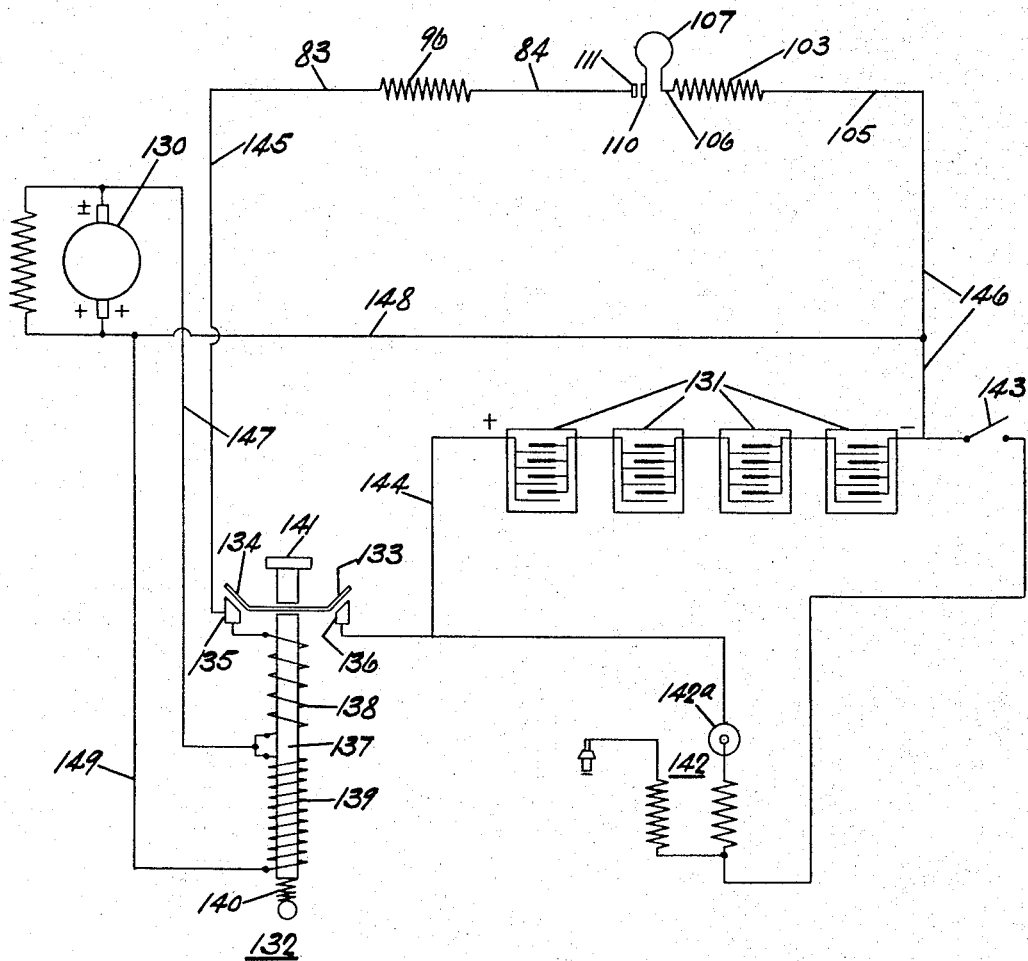
Fig. 18 is a diagrammatic view of the electric connections between the various electric elements mounted on the carburetor and an electric system associated with the engine.

Referring now to the diagram in Fig. 18, the electrical power equipment of the plant including the circuits for the already described electric heater and electro-magnetically operated throttle valve or baffle will be disclosed and explained. In said diagram 130 indicates a motor generator of known type adapted to operate as a motor to start the engine or as a generator driven by the engine to store energy in the secondary batteries 131. Interposed in the circuit between the motor generator 130 and the batteries 131 in a circuit controlling device indicated as a whole by the numeral 132. The circuit controller 132 comprises an armature 133 consisting of a core 137 and a conducting bridge 134 adapted to bridge a gap between stationary contacts 135 and 136 and thus close a circuit between them. The core 137 is surrounded by windings 138 and 139. A spring 140 tends to elevate the armature and hold the bridge away from contacts 135 and 136. The upper end of said armature may terminate in a knob or button 141 which may be considered as the starting button to be pressed upon to close the circuit between contacts 135 and 136 when it is desired to start the engine. One end of heater coil 96 is connected to stationary contact 135 by wires 83 and 145, and the other end to contact 111 by wire 84. Contact 110 adapted to close a circuit through it and contact 111 is connected by thermostatic element 107 to wire 106, which is connected to coil 103 the other end of which is connected to battery by wires 105, 146. The ignition circuit 142, in which 142a indicates the timer, is connected across the battery and may be rendered operative by closing switch 143.

When the operator decides to start the engine he depresses the button 141 thus closing the circuit between the stationary contacts 135 and 136. Current then flows from battery 131 through wire 144, contact 136, bridge switch 134, contact 135, winding 138, wire 147, to the motor generator, and returns through wire 148 and wire 146 to the other side of the battery. Some current flows from winding 138 through winding 139, wire 149, wire 148, wire 146 to the other side of the battery. The coils 138 and 139 are so wound that when current is flowing from the battery to the motor generator they oppose each other and do not hold down the armature 133; the operator must therefore keep the button 141 depressed until the engine fires regularly. After the engine has been well started the motor generator begins to generate current which flows by way of wire 147, winding 138, contact 135, bridge 134, contact 136, wire 144, battery 131, and from the other side of battery by wires 146, 148 to the motor generator. Current also flows from motor generator. by wire 147, winding 139, wire 149 back to the motor generator. When the motor generator is operating as a generator, the windings 138, 139 assist each other and hold the bridge 134 in engagement with contacts 135 and 136.

Assuming that the thermostatic device 107 is adjusted to close at a temperature of 40° F. or below, and that the temperature at starting is above 40° F., the thermostatic switch remains open and no current flows through the heater coil 96 or the coil 103 of the magnet that controls the baffle or throttle valve 97. Should the temperature be below 40° F. when the starting button is depressed, the contacts 110, 111, will of course have been closed and current will flow from the battery 131 through wire 144, contact 136, bridge 134, contact 135, wires 145, 83 to coil 96, wire 84, contacts 111, 110, element 107, wire 106, coil 103, wires 105, 146 to battery 131, thus generating heat in the fuel well 48 and turning the baffle or throttle 97 to obstruct the passage 26. Coil 103 is so designed and the thermostatic element so constructed and arranged with respect to it that after the current has been flowing in said coil for a predetermined time, say one and a half minutes, enough heat will have been generated in the coil to cause the thermostatic switch to open. Should the thermostatic switch remain closed after the motor generator begins to generate, current will continue to flow through the heater and magnet coils 96 and 103 by way of wire 147, contact 135, wires 145, 83, coil 96, wire 84, contacts 111, 110, element 107, wire 106, coil 103, wires 105, 146, 148 to motor generator.

Although the mode of operation of the charge forming apparatus may be understood from the foregoing description read in the light of the drawings, a brief explanation will now be given under conditions prevailing: (1) When the engine is running normally; (2) When the engine is started in an atmosphere above say 40° F.; (3) When the engine is started in an atmosphere below say 40° F.

(1) When the engine is running normally, and is therefore warm so that fuel vaporizes readily, the thermostatically controlled contacts remain open and no current flows through heating coil 96 or magnet coil 103. At this time therefore the heater is cold and the baffle or throttle wide open. The regulating valve 116 is adjusted to a position suitable for the prevailing temperature conditions and the demand of the engine. The engine controlled force fuel feed device, of whatever type it may be, is in operation delivering fuel constantly through pipe t to carburetor fuel reservoir 21, so that fuel is kept therein level with the top of weir 41, this level being indicated by the dot and dash line a—a in Fig. 6. There is now no fuel in the primer tank 59. The pressure due to the head of fuel in reservoir 21 causes fuel to spurt upward through the contracted duct in nozzle 50 into the passage 48 which now functions as a primary mixing chamber, inasmuch as the pumping action of the engine produces a pressure lower than atmospheric in passages 26, 27 and 48, and atmospheric air rushes through openings 58, tube 54, passage 52, annular passage 49, pulverizing and mingling with the fuel issuing from the mouth of nozzle 50. The mixture of finely subdivided fuel and air flows through well 48 now functioning as the primary mixing chamber into primary mixture passage 27, thence past the valve 116 into secondary mixture passage 26, where it is met by an auxiliary current of air rushing upward through the Venturi fixture, the final relatively lean mixture then passing open throttle 97 to the intake of the engine.

(2) When the engine stops, as when switch 143 is opened, the feed of fuel to reservoir 21 of course ceases and the pressure in said reservoir and in passages 26, 27, 48, and all connected spaces becomes equal to that of the external air. Gravitation then acts upon the fuel in reservoir 21 causing it to issue from nozzle 50 thence it flows through passages 49, 52, 53, tube 54, orifices 65c, 65b, 65a, and 65 into the chamber within primer tank 59, and fuel rises then in passage or fuel well 48 until the level is the same in reservoir 21, primer tank 59, tube 54 and fuel well 48. The capacity of primer tank and connected passages is so proportioned with respect to the capacity of carburetor fuel reservoir 21 that the level will now be substantially as indicated by dot and dash line b—b in Fig. 6. Assuming now that the temperature of the atmosphere surrounding the plant is above say 40° F. and that it is desired to start the engine; the thermostatic controlled contacts are now open, the heater in well 48 is cold, the magnet coil 103 unenergized and baffle or throttle 97 wide open. When the motor generator, upon closing of switch 132, rotates the engine, the suction thereof will reduce pressure in pasages 26, 27 and fuel well 48, thus drawing the priming supply from said fuel well into and through the passage 27 past the valve 116 into the secondary passage 26, where it meets and mingles with a strong current of air, forming a combustible mixture which then enters the engine intake, more priming fuel flows from priming tank 59 into the well 48 supplemented of course, by fuel from the reservoir 21, issuing through nozzle 50. The force fuel feed also is now in operation delivering fuel into said reservoir 21. As the suction strokes of the engine piston continue the supply of priming fuel in tank 59 falls lower and lower as does accordingly also the depth of fuel in well 48 on successive piston strokes. Furthermore, as the revolutions of the engine continue, priming fuel is delivered to the well 48 at a decreasing rate owing to the decreasing size of the orifices in tube 54, until finally, all of the priming fuel is sucked from tank 59 and connected passages. Air passes through tube 54, passages 52 and 49 and atomizes fuel issuing through nozzle 50 mingling with it in well 48, which now acts as a primary mixing chamber. The apparatus from then on functions as described under paragraph (1).

(3) Assuming now the engine has been stopped and the fuel in the carburetor fuel reservoir 21, priming tank 59 and fuel well 48 to be as described in the preceding paragraph under conditions (2); that the temperature of the surrounding atmosphere is below say 40° F.; and that it is desired to start the engine. Upon closing the switch 132 the motor generator rotates the engine, which draws priming fuel from the well 48 in the manner described under assumed conditions (2). But as the temperature controlled contacts 111 and 110 are now closed, the heater in well 48 becomes hot and heats the liquid fuel therein (in which the heater is at first partially submerged) and the pulverized fuel passing therethrough. The baffle or throttle valve 97 is now turned to obstruct the stream flowing through passage 26 and receives the impact of liquid fuel particles breaking them into finer particles, and also becomes wet with fuel which is absorbed by the strong current of air drawn into the lower end of passage 26 and around and past the baffle to the engine intake. By the time the engine gets to running normally, the coil 103 will have generated sufficient heat to open the contacts 111, 110 and the heat of the normally operating engine will thereafter keep them open, so that the heater ceases to function as a heater and the throttle or baffle valve 97 will open wide, whereafter the apparatus operates as described under condition (1).

It will be understood that the regulating valve 116 will be set by hand to the position best suited to the demands of the engine which may be determined empirically. If the thermostatic regulator shown in Figs. 9 and 10 be used, minor modifications of setting in response to temperature will be automatically effected.

The described charge forming apparatus will obviously operate in conjunction with a plant in which the engine is automatically started in response to the demands of the system in the same manner as when used in conjunction with a manually controlled starting motor, such as is illustrated in Fig. 18.

While the embodiment illustrated and described is that which is now preferred, it is to be understood that it is exemplary only and that the invention may be embodied in other forms within the scope of the appended claims without departing from the principles thereof.

I claim:

1. In a charge forming means for an internal combustion engine provided with an electrically operated starting means and means for energizing same, the combination with a carburetor including a fuel mixture channel and a fuel mixing device; of a normally ineffective electric heating device associated with the mixing device and a circuit therefor controlled by the means for energizing the starting device and adapted to be brought into effect to heat the fuel mixture while the engine starting means is operated to start the engine only at temperatures below a certain predetermined temperature.

2. In a charge forming means for internal combustion engines provided with a starting means, the combination with a carburetor including a fuel reservoir, a fuel mixture channel and a fuel mixing device interposed between the reservoir and the channel and located within said reservoir; of a heating device adjacent the mixing device and means adapted to be brought into effect by the starting operation to heat the fuel mixture while the engine starting means is operated to start the engine.

3. In a charge forming device for an internal combustion engine provided with a starting means; a carburetor including a carburetor fuel reservoir; a primer fuel reservoir; a fuel mixture channel; a fuel mixing device interposed betwen the two reservoirs and the fuel mixture channel; a heating device associated with the mixing device and means responsive to the starting operation adapted to be brought into effect to heat the fuel mixture during the operation of the engine starting means.

4. In a charge forming means for an internal combustion engine provided with a starting means; a carburetor comprising a main body portion including a fuel mixture passage; a carburetor fuel reservoir; a primer reservoir in communication with and positioned within said carburetor fuel reservoir; an atomizing and mixing device interposed between the carburetor fuel reservoir, the primer reservoir and the fuel mixture passage, a heating device supported by the body portion of the carburetor and interposed between the mixing device and the fuel passage and means operative in response to the starting operation adapted to be brought into effect to cause the heating device to heat the fuel passing from the mixing device while the engine starting means is in operation to start the engine.

5. In a charge forming means for an internal combustion engine provided with a starting means; a carburetor comprising a main body portion including a fuel mixture passage and a throttle valve in one of said passages; a fuel mixing device associated with the said carburetor; a heating unit for heating the fuel mixture passing into the fuel mixture passages of the carburetor; a throttle and throttle controlling device, a thermostatically controlled means for causing said device and said heating unit to be either operable or inoperable and means to cause said heating unit and throttle controlling device to be brought into effect in response to operation of the engine starting means when the thermostatically controlled means is in one position whereby to cause the heater to heat fuel passing into the mixture passage and the throttle controlling device to operate the throttle for controlling the mixture passing through the fuel mixture passage.

6. In a charge forming means for an internal combustion engine, including an electrical starting means; a carburetor comprising a fuel mixture channel having a throttle valve normally held in open position, an electrical heating unit associated with the carburetor, an electrical device associated with the throttle valve for operating same, a thermostatic controlling means adapted to cause said heater and said electrical device to be operative or inoperative; and means rendered effective in response to the engine starting activity when the thermostatic devices are in one position to render the heater and valve controlling means operative.

7. In a charge forming means for an internal combustion engine provided with an electrical starting device; including a circuit; a carburetor comprising a main body portion having a fuel mixture passage; a throttle valve located within said passage and normally held in wide open passage position; an electrical heating unit associated with the carburetor for heating the fuel passing therethrough; an electric device adapted to operate the throttle valve, a circuit in which said heater and device are included; a thermostatically operated circuit opening and closing device therein which at certain predetermined low temperatures will enable said heater and device to be energized and at certain higher temperatures will cause them to be de-energized; and means responding to current flowing in the circuit of the electric starting device whereby when said device is brought into effect for the cranking of the engine, the heater unit and throttle operating device will also be brought into effect for heating the fuel flowing through the carburetor and operating the throttle to choke the fuel mixture passage respectively; provided the thermostatically controlled circuit making and breaking device is in circuit closing position.

8. In a charge forming means for an internal combustion engine provided with an electrical starting system including a source of current, a dynamo electric machine capable of acting as a generator for charging the source of current or as a motor to crank the engine, and a controlling switch interposed between said dynamo electric machine and the source of current; a carburetor having a fuel mixture channel provided with a throttle valve normally held in channel open position; an electric heating unit associated with the carburetor for heating the fuel mixture passing therethrough; and an electro-magnetically controlled throttle operating device, a circuit therefor depending for energization on the circuit of the starter, a circuit making and breaking means in said circuit that includes the heater and throttle actuating device associated with a thermostatically controlled element which at comparatively high temperatures will tend to hold said circuit making and breaking means in circuit breaking position and in comparatively low temperatures will tend to cause said circuit opening and closing means to be in closed position, whereby, when the controlling switch is operated for starting the engine, current will be permitted to flow through said throttle controlling device and heating unit when said thermostatically controlled circuit opening and closing means is in circuit closing position for purposes set forth.

9. In a charge forming means for internal combustion engines, the combination of a starting device for said engine, a carburetor having a mixing chamber, a heating element in said mixing chamber, and means associated with said starting device for rendering said element effective to heat the mixture only at temperatures below a certain predetermined temperature, when the starting device is operated to start the engine.

10. In a charge forming means for internal combustion engines, the combination of a starting device for said engine, a carburetor having a mixing chamber, a heating element in said mixing chamber, means associated with said starting device for rendering said element effective to heat the mixture only at temperatures below a certain predetermined temperature, when the starting device is operated to start the engine, and means for rendering said heating device ineffective when the engine temperature reaches a predetermined degree.

11. In a charge forming means for internal combustion engines, the combination of a carburetor having a primary mixing chamber, a secondary mixing chamber adapted to receive a primary mixture of fuel and air from said primary mixing chamber, an air inlet for said secondary mixing chamber, a starting device for said engine, a heating element in said primary mixing chamber and adapted to heat the primary mixture before delivery to the secondary mixing chamber, and means associated with the starting device to render the heating element effective, whereby said element generates heat in response to the operation of the starting device to start the engine.

FRED E. ASELTINE.